July 11, 1939.  E. ENGEL  2,165,358

VEHICLE BRAKE

Filed June 14, 1935  2 Sheets-Sheet 1

Inventor
Ernst Engel
Sommers & Young
Attys.

July 11, 1939.  E. ENGEL  2,165,358
VEHICLE BRAKE
Filed June 14, 1935  2 Sheets-Sheet 2
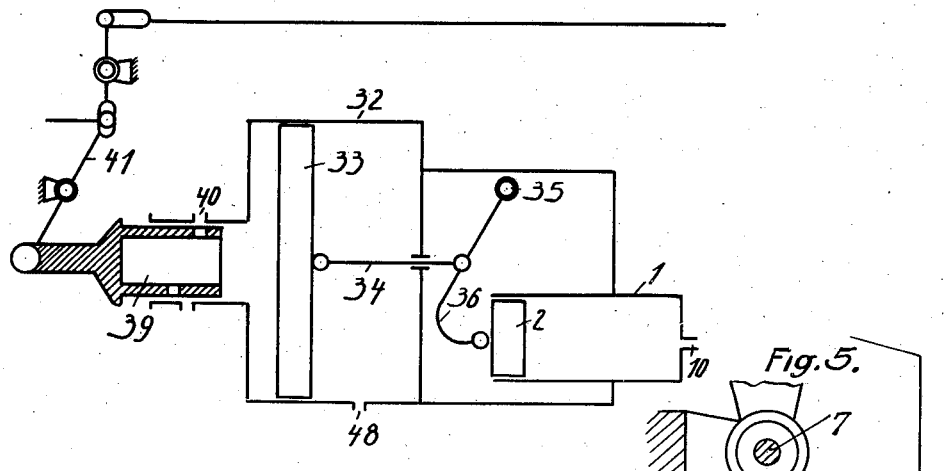
Fig. 3
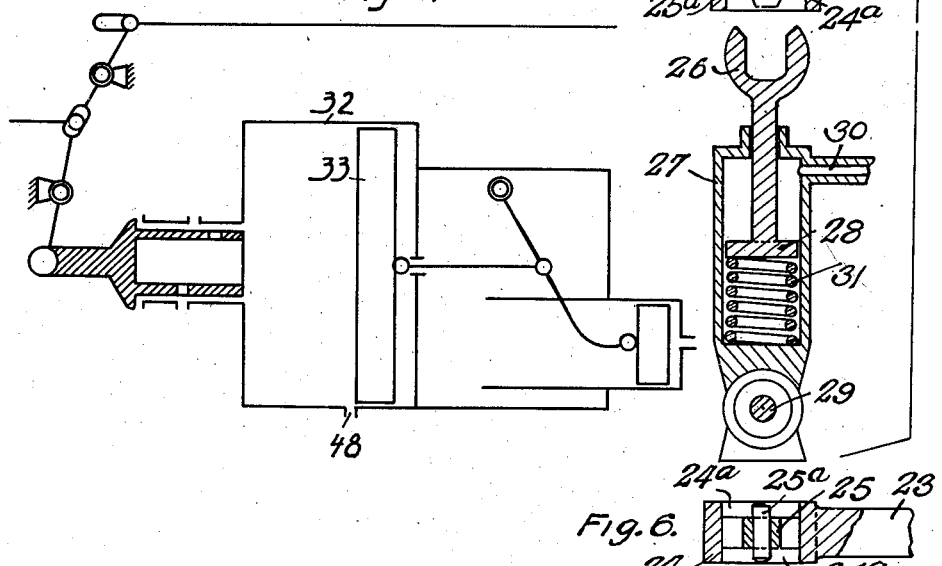
Fig. 4.
Fig. 5.
Fig. 6.
Inventor
Ernst Engel,
By Sommers & Young
Attys.

Patented July 11, 1939

2,165,358

UNITED STATES PATENT OFFICE 2,165,358

VEHICLE BRAKE

Ernst Engel, Frankfort-on-the-Main, Germany, assignor to Alfred Teves Maschinen- und Armaturen-Fabrik Gesellschaft mit beschrankter Haftung, Frankfort-on-the-Main, Germany Application June 14, 1935, Serial No. 26,676
In Germany February 11, 1935

4 Claims. (Cl. 188—106)

In vehicles such as motor vehicles, tram-cars and the like, two brake operating gears are usually provided which can be operated independently of one another. One is usually constructed as a foot actuated mechanism and is employed for normal braking purposes whereas the other is usually constructed as a hand actuated gear and is generally only employed if for any reason the foot operated gear fails.

It can, however, occur that on abrupt braking in an emergency the first or foot operated gear will fail and the driver will need to be in a position to immediately grasp the hand lever and apply the second or hand operated gear. The object of the present invention is to provide for automatic actuation of a second brake operating gear corresponding to the usual hand operated gear by the foot-operated lever if the first brake operating gear fails, and according to the invention the two brake operating gears are automatically coupled together if, for example, in the case of a foot actuated hydraulic operating gear, the force transmitting liquid has leaked out, or if in the case of a compressed air brake operating system, the compressed air is not under the requisite pressure or the conduit therefor has been damaged.

The coupling of the two brake operating gears or system is effected by the provision of a separate cylinder equipped with a piston which is connected with the pressure conduit for the force transmitting liquid of a hydraulic gear or for the compressed air of an air operated gear. The piston of this cylinder is subjected to the action of a spring and this spring is compressed by the pressure of the fluid force transmitting medium. If the pressure of the force transmission fluid falls then the spring displaces the piston and with it a coupling member which connects the foot-actuated lever with a hand-actuated lever in such manner that a further actuation of the former occasions the actuation of the brake operating gear associated with the latter.

Three embodiments of the invention are shown by way of example in the accompanying drawings in which:

Fig. 1 diagrammatically shows an embodiment in the case of an ordinary motor vehicle with hydraulically actuated brakes.

Figs. 3 and 4 show two different settings of a third embodiment.

Fig. 5 is an enlarged side sectional view of mechanism for connecting two braking systems to operate one in the event of the failure of the other.

Fig. 6 is a horizontal sectoinal view of a detail on the line VI—VI of Fig. 5.

Figure 1:
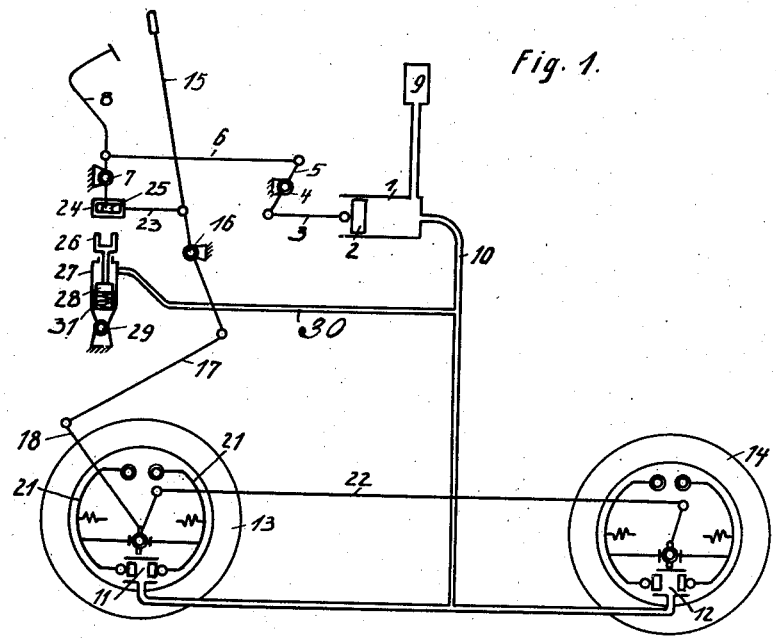

In the embodiment according to Fig. 1, the cylinder in which the hydraulic pressure is produced is indicated by numeral 1. In it operates a piston 2 which by means of the link 3, the lever 5 pivoted at 4, and the rod 6 is connected to the foot-actuated lever 8 pivoted at 7. The pressure cylinder 1 is connected on the one hand with the reservoir 9 for the braking fluid and on the other hand by way of the conduit 10 with the two hydraulic brake cylinders 11 and 12 which are provided on the wheels or pairs of wheels 13 and 14 of the vehicle in known manner.

The second brake gear is actuated from the hand lever 15 which is pivoted at 16 and through the intermediary of the link 17 engages the lever 18 which operates on a cam 19 provided in the brake arrangement of the wheel 13 which, again in known manner, operates the two brake jaws 20 and 21. By means of the rod 22 this mechanical brake arrangement is connected with that of the wheel or wheels 14.

Both brakes, the hydraulically operated brake and the mechanically operated brake, can be operated independently of each other. The two actuating levers 8 and 15 of the two brake operating gears can however be connected by the rod 23 which at its end carries a slide 24 in which a block 25 is slidable, the block 25 being pivotally attached to the end of the foot-actuated lever 8. The slide 24, normally, may be movably supported by engagement of pin 25a in arcuate slots 24a. Beneath the slide 24 is a forked member 26 carried on the small piston 28 displaceable in the cylinder 27. The cylinder 27 is pivotal about 29 and is connected with the hydraulic pressure conduit 10 by a flexible pipe line 30. The mode of operation is as follows:

By applying the foot to the foot-actuated lever 8 the piston 2 is displaced in the pressure cylinder 1 by means of the rod 6 and the levers 5 and 3, and thus the braking fluid in the conduit 10 is subjected to pressure so that the brake cylinders 11 and 12 come into operation and the brake jaws are applied. As the block 25 is displaceable in the slide 24, the motion of the foot-actuated lever 8 does not re-act on the hand-actuated lever 15. The hand-actuated lever 15 can be moved independently, whereby the mechanical brake gear associated therewith is applied without influencing the hydraulic brake gear.

By way of the flexible conduit 30, the piston 28 is also subjected to the small pressure constantly present in the brake conduit 10 and this small pressure is sufficient to compress the spring 31 which operates on the piston 28 from below. In this way the fork 26 is held in the position shown in Fig. 1.

If, however, the pressure in the conduit 10 drops, due perhaps to a leak, then the pressure operating on the piston 28 through the flexible conduit 30 is also reduced and the spring 31 displaces the piston 28 upwardly whereby the fork 26 embraces the block 25 and prevents it from moving relatively to the slide 24. In this way the foot-actuated lever 8 is connected with the lever 15 by way of the rod 23, and the foot-actuated lever 8 now operates on the lever 15 and thus on the second or mechanical brake operating means by way of the levers 17, 18 and 22. Thus it is not necessary for the driver to grasp the hand lever when the hydraulic gear fails but the mechanical gear is immediately connected with the foot-actuated lever by the coupling arrangement.

Figure 2:
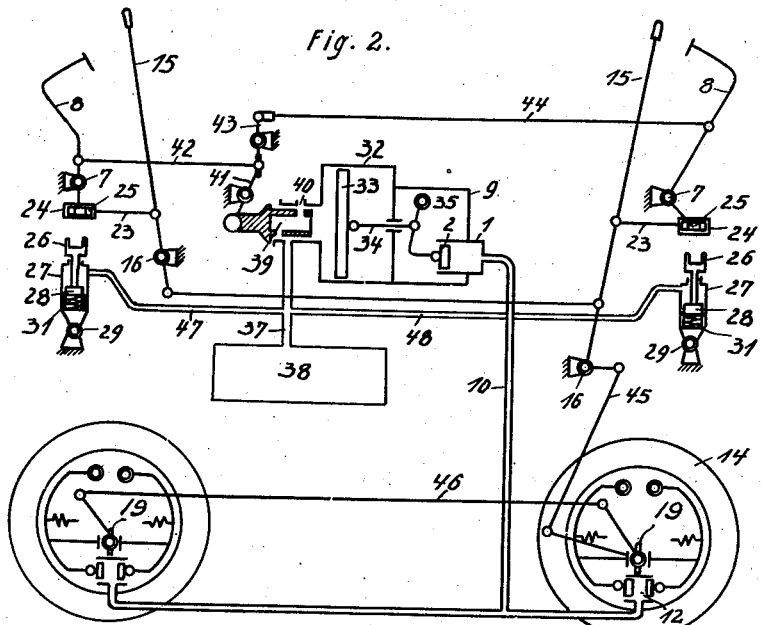
Fig. 2 is intended for a tram-car or like vehicle comprising two driving stations each provided with corresponding brake levers.

In the embodiment according to Fig. 2, the brake arrangement is shown for a tram-car or like vehicle in which the brakes are to be actuated from two driving stations alternatively. Here the modification is introduced that the foot-actuated lever 8 does not operate directly on the pressure piston of the hydraulic pressure device but on a pneumatic pressure relay device which in turn actuates the hydraulic piston. A compressed air cylinder 32 is provided in which the piston 33 is displaceable. This piston is connected by means of the rod 34 with the lever 36 which is pivoted at 35 and is accommodated within the reservoir 9 for the braking fluid. The lever 36 operates on the piston 2 of the hydraulic cylinder 1. This is again followed by the conduit 10 which as in the first embodiment is connected with the brake cylinders 11, 12 of the two wheels or sets of wheels 13 and 14.

In front of the piston 33 the cylinder 32 is connected with the compressed air container 38 by the conduit 37. A piston valve 39 serves to produce or interrupt this connection and on the other side the aperture 40 enables the pressure in front of the piston 33 to be relieved.

The piston valve 39 is connected with one of the foot-actuated levers 8 by way of the lever 41 and the rod 42 and simultaneously it is connected with the foot-actuated lever 8 at the other driving station by way of the lever 43 and the rod 44.

At both driving stations the hand actuated levers for the mechanical brake gears are again indicated by 15. They are pivotal about 16 and are connected with the mechanical part of the brake gears by means of a suitable linkage 45, 46. At each driving station the foot-actuated lever 8 can be connected with the hand lever 15 by means of a rod 23 which carries a slide 24 in which the block 25 carried at the end of the associated foot actuated lever 8 is displaceable. Disposed beneath each slide 24 is a coupling fork 26 with associated pistons 28, springs 31 and cylinders 27 which are pivotal about pivots 29. By means of the flexible conduits 47 and 48 the spaces in the two cylinders 27 above the pistons 28 are connected with the conduit 37 leading to the compressed air container 38.

If one of the foot-actuated levers 8 is actuated, then by way of the linkage 42, 41 or 44, 43, 41, the piston valve 39 is so disposed that compressed air can pass from the reservoir 38 to the cylinder 32 in front of the piston 33 to displace the latter whereby the hydraulic piston 2 is displaced within the cylinder 1 and the brake is applied by the hydraulic gear.

If the pressure in the compressed air container 38 falls then the springs 31 urge the plungers 28 upwardly so that the forks 26 embrace the sliding blocks 25 and thus couple the foot-actuated levers 8 with the levers 15 so that then the motion of the foot-operated levers 8 actuates directly on the mechanical brake gear.

The coupling device can of course be of any other kind differing from that described and shown, it merely being important that at the moment of failure of one brake the coupling automatically connects the two brake gears together.

Instead of the hydraulic braking gear any other suitable braking gear such as a mechanical brake can be employed.

As the spring 31 operates on the piston 28 a certain preliminary pressure is applied in the brake conduit, which prevents the formation of hollow spaces in the liquid in the brake conduit when the brake liquid contracts.

In the arrangement shown in Fig. 2 provision is made for the foot-actuated lever to be coupled with the hand-actuated lever for the other brake if the compressed air conduit becomes leaky but provision is not made for this connection to be effected if the pressure in the fluid conduit fails, although, as mentioned above, this contingency can be guarded against by providing a separate control for the coupling device responsive to the pressure in the braking fluid conduit. Constructions will now be described with reference to Figs. 3 and 4 in which the desired automatic coupling is obtained in this case also without the use of a separate control mechanism for the coupling device. In these constructions a discharge aperture is provided at a suitable point in the compressed air cylinder through which the air can escape from the cylinder if in consequence of a reduction in pressure in the fluid conduit the piston is urged too far forwardly. After the piston has passed over this aperture, the air can escape through it and in this way it is attained that the coupling device between pedal and hand lever is brought into operation.

The reference numerals employed are the same as those in Fig. 2 and only the compressed air and pressure cylinders with the controlling piston valve 39 are shown in Figs. 3 and 4. In other respects the arrangement is as in Fig. 2. Within the cylinder 32 is the piston 33 which is connected by means of the rod 34 with the lever 36 pivoted at 35 and carrying the pressure piston 2 within the pressure cylinder 1. Provided in the wall of the cylinder 32 is an aperture 48 which normally lies behind the piston 33 even in the extreme braking position as shown in Fig. 3.

If, perhaps due to a leak, the pressure falls in the pressure conduit 10 leading to the brake cylinders at the wheels, then under the action of the compressed air working on the piston 33, this piston and also the small piston 2 are displaced further to the right when the brakes are applied. The piston thus assumes the position shown in Fig. 4 in which the piston 43 has passed beyond the opening 48 and exposes the same so that now all the compressed air can escape from the reservoir and from the compressed air conduit and thus the coupling device between foot-actuated and hand-actuated levers of the two brakes becomes operative.

I claim:

1. A vehicle brake system comprising a set of brakes, a hydraulic brake operating gear, a separate brake operating gear, a slotted guide associated with the said separate operating gear, a member associated with the hydraulic operating gear slidable in said guide, a forked device to embrace said slidable member to hold it against motion relatively to said slotted guide, a plunger connected to said forked device, a cylinder within which said plunger operates, a spring urging said plunger to bring said forked device into engagement with said slidable member and a conduit connecting the conduit for the hydraulic medium with said cylinder on the side of the plunger opposite to the spring.

2. A vehicle brake system comprising a set of brakes, a hydraulic brake operating gear, an independently operable brake operating gear, a compressed air reservoir, a cylinder, a conduit connecting said reservoir with said cylinder, a piston movable in said cylinder under the action of the compressed air to operate the hydraulic brakes, valve mechanism in said conduit for controlling the passage of compressed air to said cylinder, means for operating said valve mechanism and means responsive to the failure of pressure in said conduit between the reservoir and the valve mechanism for coupling said valve mechanism operating means with said independently operable brake operating gear.

3. A vehicle brake system according to claim 2, and means responsive to the failure of pressure of the fluid medium for coupling the valve mechanism operating means with the independently operable brake operating gear.

4. A vehicle brake system comprising, a set of brakes, a hydraulic brake operating gear, an independently operable brake operating gear, separable manual actuating devices for each of said gears, the hydraulic brake operating gear having a pneumatic relay controlled by the actuating device of the hydraulic gear, said relay having a cylinder, a piston slidable therein, mechanical means for applying operating pressure from said piston to the fluid of the hydraulic gear, a compressed air supply, a conduit from said supply to said one end of said cylinder to cause the piston to move in the cylinder when air is admitted, valve means controlled by the manual actuating means of the hydraulic brake operating gear for controlling the admission of air to said cylinder, the cylinder having an opening in its wall, beyond the normal position of the piston when the brakes are applied thereby, for enabling free escape of compressed air from said cylinder when the piston passes said normal position, and means responsive to the failure of pressure of the relay actuating air for coupling the manual actuating device of the hydraulic gear with the independently operable gear upon reduction of the pressure of the relay actuating air below a certain pressure.

ERNST ENGEL.